(12) United States Patent
Sakaguchi et al.

(10) Patent No.: US 12,492,950 B2
(45) Date of Patent: Dec. 9, 2025

(54) ESTIMATION METHOD OF STRESS AND STRAIN HISTORY IN CEMENT-BASED COMPOSITE MATERIALS AND CALCITE PARTICLE AGGREGATES

(71) Applicant: YAMAGUCHI UNIVERSITY, Yamaguchi (JP)

(72) Inventors: Arito Sakaguchi, Yamaguchi (JP); Kouhei Ando, Yamaguchi (JP)

(73) Assignee: YAMAGUCHI UNIVERSITY, Yamaguchi (JP)

( * ) Notice: Subject to any disclaimer, the term of this patent is extended or adjusted under 35 U.S.C. 154(b) by 282 days.

(21) Appl. No.: 18/014,475

(22) PCT Filed: Jul. 8, 2021

(86) PCT No.: PCT/JP2021/025807
§ 371 (c)(1),
(2) Date: Jan. 5, 2023

(87) PCT Pub. No.: WO2022/009957
PCT Pub. Date: Jan. 13, 2022

(65) Prior Publication Data
US 2023/0258509 A1 Aug. 17, 2023

(30) Foreign Application Priority Data
Jul. 9, 2020 (JP) .................................. 2020-118208

(51) Int. Cl.
G01L 1/06 (2006.01)
C04B 14/28 (2006.01)
(Continued)

(52) U.S. Cl.
CPC ................ G01L 1/06 (2013.01); C04B 14/28 (2013.01); C04B 20/0008 (2013.01);
(Continued)

(58) Field of Classification Search
CPC ......... G01L 1/06; G01N 33/38; G01N 33/383
See application file for complete search history.

(56) References Cited

U.S. PATENT DOCUMENTS 4,120,195 A * 10/1978 Leeming ............... G01L 1/2268
73/768
8,661,913 B2 * 3/2014 Sakaguchi .......... C04B 40/0096
73/803

(Continued)

FOREIGN PATENT DOCUMENTS

CN      105283742      1/2016
CN      105509934      4/2016

(Continued)

OTHER PUBLICATIONS

Olivier Lacombe et al., "Calcite Twin Formation, Measurement and Use as Stress-Strain Indicators: A Review of Progress over the Last Decade", Geosciences, vol. 11, No. 11, Oct. 28, 2021, pp. 1-49.

(Continued)

*Primary Examiner* — John Fitzgerald
(74) *Attorney, Agent, or Firm* — JCIPRNET

(57) ABSTRACT

For measuring the stress history in a simple form, which is widely applicable to various types of structural materials which the elastic modulus is different from each other, a large number of calcite particles is embedded as a stress sensor in a cement-based composite material that can be elastically deformed after receiving an external.

A twin-crystal density of the calcite particles is measured after an external force is applied to the composite material, to convert the twin-crystal density to a strain by an approximate formula set in terms of a strain ε (%) generated in the composite material and a twin-crystal density Dtw (lines/mm) of the calcite particles, and further to convert this strain to a stress by the elastic modulus of the composite material, whereby to estimate the history of stress and strain. The (Continued)

approximate formula between strain and twin-crystal density is independent of the modulus of the composite material and is used in a common form.

10 Claims, 10 Drawing Sheets

(51) Int. Cl.
  *C04B 20/00* (2006.01)
  *C04B 20/10* (2006.01)
  *G01N 33/38* (2006.01)
  *C04B 103/00* (2006.01)
  *C04B 111/00* (2006.01)

(52) U.S. Cl.
  CPC ....... *C04B 20/1092* (2013.01); *G01N 33/383* (2013.01); *C04B 2103/0041* (2013.01); *C04B 2111/00991* (2013.01)

(56) References Cited

U.S. PATENT DOCUMENTS

| | | | |
|---|---|---|---|
| 9,835,611 B2 * | 12/2017 | Sakaguchi | G01L 5/0047 |
| 11,874,184 B2 * | 1/2024 | Merrell | G01L 1/20 |
| 11,906,472 B2 * | 2/2024 | Jiang | G01N 33/383 |
| 2011/0232394 A1 | 9/2011 | Sakaguchi et al. | |
| 2014/0020618 A1 | 1/2014 | Yanagisawa et al. | |
| 2016/0103114 A1 * | 4/2016 | Sakaguchi | G01M 5/0033 73/803 |

FOREIGN PATENT DOCUMENTS

| | | | |
|---|---|---|---|
| CN | 105547538 | 5/2016 | |
| EP | 2357459 B1 * | 7/2013 | ............... G01N 9/36 |
| EP | 3006912 B1 * | 7/2018 | ........... G01N 33/383 |
| JP | 2876007 | 3/1999 | |
| JP | 2008286689 | 11/2008 | |
| JP | 2014228511 | 12/2014 | |
| WO | 2012108473 | 8/2012 | |
| WO | 2014192697 | 12/2014 | |

OTHER PUBLICATIONS

"Office Action of China Counterpart Application", with English translation thereof, issued on Nov. 19, 2024, pp. 1-30.
"Notice of Reasons for Refusal of Japan Counterpart Application", issued on Dec. 10, 2024, with English translation thereof, p. 1-p. 6.
Arito Sakaguchi et al., "Elastic stress indication in elastically rebounded rock," Geophysical Research Letters, vol. 38, May 2011, pp. 1-4.
"International Search Report (Form PCT/ISA/210) of PCT/JP2021/025807," mailed on Aug. 31, 2021, with English translation thereof, pp. 1-4.

* cited by examiner (a) Forming Bottomed Hole (b) Embedding Synthetic Calcite Particle Aggregates Into Building (c) Embedding Synthetic Calcite Particle Aggregates Into Building (d) Marking Of Embedding Location (A-Arrow View)

ESTIMATION METHOD OF STRESS AND STRAIN HISTORY IN CEMENT-BASED COMPOSITE MATERIALS AND CALCITE PARTICLE AGGREGATES

CROSS-REFERENCE TO RELATED APPLICATION

This application is a 371 application of the international PCT application serial no. PCT/JP2021/025807, filed on Jul. 8, 2021, which claims the priority benefit of Japan application no. 2020-118208, filed on Jul. 9, 2020. The entirety of each of the above-mentioned patent applications is hereby incorporated by reference herein and made a part of this specification.

TECHNICAL FIELD

This invention relates to an estimation method of stress and strain history in cement-based composite materials and calcite particle aggregates.

BACKGROUND ART

In order to evaluate the stress and damage generated in structural materials mainly composed of cement, a method of estimating them from the sounds of hammering and cracking is used. This method relies on human intuition and experience, and has low reliability.

Natural disasters such as earthquakes, tornadoes, typhoons, and accidents such as collisions of transportation systems may temporarily apply large external forces to concrete structural materials. In that case, if the structural material does not break and deforms within its elastic limit, the structural material recovers after the external force is released. In the result, it is not possible to accurately determine the magnitude of the force applied to the structural material, or what kind of stress generated in which part.

In order to measure the internal stress in structural materials, there is known a method of measuring the existing stress by installing markers and sensors in the structural material in advance, or a method of extracting a core and estimating the stress from the rebound amount or the AE Kaiser effect (which refers to deformation due to external action and generation of elastic waves at the time of micro destruction).

In evaluating the safety of concrete structures, it is important to know what kind of stress generated in the structural material. Therefore, it is conceivable to obtain the stress history by installing a strain sensor on the surface of the concrete material and constantly monitoring it. However, it can be said that it is not realistic to constantly perform such monitoring over a long period of time for general structures such as buildings, bridges, and tunnels. In addition, it can be thought that the electrical sensor is a foreign substance for such structural materials and the mechanical properties differ from those of the original structural materials.

For this reason, if we can obtain knowledge about the large stress that generated in structural materials in the past, by giving the structural material itself the ability to record the past stress and measuring it when necessary, it is thought that it will greatly contribute to the safety evaluation of structures. Therefore, technologies for that purpose have been proposed.

The Patent Document 1 discloses a measuring method of the stress history where a concrete specimen is sandwiched between pressure plates so that a load exceeding the past stress history is repeatedly applied and the Kaiser effect is repeatedly detected. On the other hand, the Patent Document 2 discloses a measuring method of the stress history received by an object to be measured that contains calcite particles and can be elastically deformed by receiving external forces, on the basis of changes in the twin-crystal density of the calcite particles before and after receiving external forces.

The Patent Document 3 discloses a measuring method of the stress history received by an object to be measured in which a large number of calcite particles are embedded and which can be elastically deformed by receiving external forces, on the basis of the ratio of calcite particles in which twin-crystal deformation occurs after receiving external forces. The technology of the third document is an improvement of the technology of the second patent so as to be applicable for low stress condition.

The Non-Patent Document 1 related to the Patent Document 2, discloses that the twin-crystal density is proportional to the differential stress from the result of performing a compression test on a sandstone specimen, and that the calculating method of stress-strain relationship is obtained from a simulation of virtual rocks using the discrete element method (DEM). The patent fourth document discloses a technology for synthesizing calcite particles necessary for verification in the second and Patent Document 3s as well as the Non-Patent Document 1.

In the measuring method using the Kaiser effect as in the Patent Document 1, it is necessary to generate cracks by applying a load in the object to be measured. But as cracks are generated by various factors other than the stress history of the material, it is unreliable for an estimation of the stress history and cannot be used under low stress condition where cracks do not occur.

In the Patent Document 2 and the Non-Patent Document 1, it is verified that the twin-crystal density of calcite particles changes according to the magnitude of the external force applied to the object to be measured, and based on this, the stress history of the object to be measured is calculated. However, since the relationship between stress and twin-crystal density varies depending on the elastic modulus of the object to be measured, it is necessary to obtain an appropriate relationship between stress and twin-crystal density for each of the objects to be measured. Also, in the Patent Document 3, the stress history received by an object to be measured in which a large number of calcite particles are embedded and which can be elastically deformed by receiving external forces, is calculated on the basis of the ratio of calcite particles in which twin-crystal deformation occurs after receiving external forces. However, in this case as well, it is necessary to obtain, for each of the objects to be measured, an appropriate relationship between stress and the ratio of calcite particles in which twin-crystal deformation occurs.

PRIOR ART DOCUMENTS

Patent Documents

[PATENT DOCUMENT 1] Japanese Patent No. 2876007
[PATENT DOCUMENT 2] JP 2008-286689A
[PATENT DOCUMENT 3] JP 2014-228511 A
[PATENT DOCUMENT 4] WO 2012/108473

Non-Patent Document

[NON-PATENT DOCUMENT 1] Sakaguchi et. al. "Elastic stress indication in elastically rebounded rock", Geophysical Research Letters, vol. 38, L09316, doi:10.1029/2011GL047055, 2011

SUMMARY OF THE INVENTION

Problems to be Solved by the Invention

Regarding the object to be measured of structural materials such as concrete, it is proposed to measure the stress history received by the object to be measured from the relationship between the stress and the twin-crystal density due to the external force received (as in the Patent Document 2), or from the stress and the ratio of calcite particles in which the twin-crystal deformation occurs due to the external force received (as in the Patent Document 3). However, these methods cannot use the same relationship for objects to be measured where the elastic modulus is different from each other. Therefore, it is an object of the present invention to provide a method for measuring the stress history in a simple form, which is widely applicable to various types of structural materials if the twin-crystal density and the elastic modulus are known.

Also, it is another object of the present invention to provide a method of measuring the twin-crystal density of the calcite particles collected from the object to be measured in which a plurality of calcite particles as a stress sensor are embedded so as to be removable, and to provide configuration examples of the plurality of calcite particles suitable for practicing the method, as well.

Means to Solve the Problems

In order to solve the aforementioned problems, an estimation method of stress and strain history in cement-based composite materials according to the present invention is an estimation method of stress and strain history regarding to an object to be measured (50) in which a plurality of calcite particles (11) having a particle diameter of a predetermined size are embedded as a stress sensor, wherein a plurality of the calcite particles (11) are calcite particles with no twin crystals that are mixed in a predetermined mixing ratio in a cement composite material (12) prepared in advance so that an elastic modulus becomes a predetermined value in a solidified state to be formed into a predetermined shape of a calcite particle aggregates (10) as a whole, and one or more of the calcite particle aggregates (10) are removably embedded in the object to be measured (50) with non-shrinkage mortar (60) or concrete structural material.

A second feature of an estimation method of stress and strain history in cement-based composite materials according to the present invention is an estimation method of stress and strain history regarding to an object to be measured (50) in which a plurality of calcite particles (11) having a particle diameter of a predetermined size are embedded as a stress sensor, wherein a plurality of the calcite particles (11) are calcite particles with no twin crystals that are mixed in a predetermined mixing ratio in a non-shrinkage mortar (60) prepared in advance so that an elastic modulus becomes a predetermined value in a solidified state to be formed into a calcite particle aggregates (10') having fluidity, and the calcite aggregates (10') are removably embedded in the object to be measured (50) while filled in a recess (51) provided in the object to be measured (50).

A third feature of an estimation method of stress and strain history in cement-based composite materials according to the present invention is that the said shape is a sphere, a polyhedron or a plate.

A fourth feature of an estimation method of stress and strain history in cement-based composite materials according to the present invention is that the calcite particles (11) contained in the calcite particle aggregates (10, 10') are colored.

A fifth feature of an estimation method of stress and strain history in cement-based composite materials according to the present invention is that the calcite particle aggregates (10, 10') collected from the object to be measured (50) are to have surfaces polished to such an extent that the twin crystals of the calcite particles (11) can be observed.

A sixth feature of an estimation method of stress and strain history in cement-based composite materials according to the present invention is that the twin-crystal density (Dtw) of the calcite particles are measured on one or more surfaces of the polished calcite particle aggregates (10, 10').

A seventh feature of an estimation method of stress and strain history in cement-based composite materials according to the present invention is that a relationship between the twin-crystal density (Dtw) of the calcite particles and the stress history ($\sigma$) generated in the object to be measured (50) is configured to correspond to each other on one to one for each elastic modulus of the cement composite material (12) or the non-shrinkage mortar (60).

An eighth feature of an estimation method of stress and strain history in cement-based composite materials according to the present invention is that when the elastic modulus of the cement composite (12) or the non-shrinkage mortar (60) is uniquely fixed, the relationship between the twin-crystal density (Dtw) of the calcite particles and the stress history ($\sigma$) is configured to be linearly approximated.

A ninth feature of an estimation method of stress and strain history in cement-based composite materials according to the present invention is that the stress history ($\sigma$) occurring in the object to be measured (50) is estimated, in a conversion from the twin-crystal density (Dtw) of the calcite particles to the stress history ($\sigma$), by using a following approximate formula (1) set in terms of the strain ($\varepsilon$) generated in the object to be measured (50) and typical values of the twin-crystal density (Dtw) of the calcite particles $$\varepsilon = 0.0094 Dtw - 0.2 \tag{1}$$

to convert the measured twin-crystal density (Dtw) of calcite particles to strain ($\varepsilon$), and further to convert the strain ($\varepsilon$) to stress by the elastic modulus of the cement composite (12) or the non-shrinkage mortar (60).

A tenth feature of an estimation method of stress and strain history in cement-based composite materials according to the present invention is that the calcite particle aggregates (10, 10') contain non-twin-crystal synthetic calcite particles (11) having a particle size of 5 μm to 1.50 mm.

An eleventh feature of an estimation method of stress and strain history in cement-based composite materials according to the present invention is that the mixing ratio of the non-twin-crystal synthetic calcite particles (11) in the calcite particle aggregates (10, 10') is 0.3 to 10% by volume.

Also, calcite particle aggregates (10, 10') according to the present invention for carrying out the estimation method of the stress and strain history in cement-based composite materials have as a stress sensor, calcite particles (11) with a particle diameter of a predetermined size, mixed and dispersed in a cement composite material (12) serving as a base material.

A second feature of a calcite particle aggregates (10) according to the present invention is that a plurality of calcite particles (11) as a stress sensor having a particle diameter of a predetermined size are mixed and dispersed in a cement composite material (12) serving as a base material, having a predetermined shape as a whole.

A third feature of a calcite particle aggregates (10) according to the present invention is that the said shape is a sphere, a polyhedron or a plate.

A fourth feature of calcite particle aggregates (10,10') according to the present invention is that the calcite particles (11) are colored.

A fifteenth feature of calcite particle aggregates (10,10') according to the present invention is that the calcite particle aggregates (10, 10') contain non-twin-crystal synthetic calcite particles (11) having a particle size of 5 μm to 1.50 mm.

A sixth feature of calcite particle aggregates (10,10') according to the present invention is that a mixing ratio of the non-twin-crystal synthetic calcite particles (11) in the calcite particle aggregates (10, 10') is 0.3 to 10% by volume.

Effects of the Invention

An estimation method of stress and strain history according to the present invention, is configured to have a large number of calcite particles embedded as a stress sensor in a cement-based composite material that can be elastically deformed by an external force, measuring the twin-crystal density of the calcite particles after receiving an external force, converting the twin-crystal density into strain using an approximate formula showing a relationship between strain and twin-crystal density, and further converting the strain into stress. As a result, the stress and strain history received by the cement-based composite material can be easily calculated in a common form regardless of kinds of the materials.

In addition, an estimation method of stress and strain history according to the present invention, allows a large number of calcite particles removably embedded as a stress sensor inside of an object to be measured, capable of collecting the embedded calcite particles from the object to be measured and measuring the twin-crystal density of the collected calcite particles.

Also, a calcite particle aggregates according to the present invention allows for preferably implementing the estimation method of the stress and strain history according to the present invention.

BRIEF DESCRIPTIONS OF DRAWINGS

Figure 3:
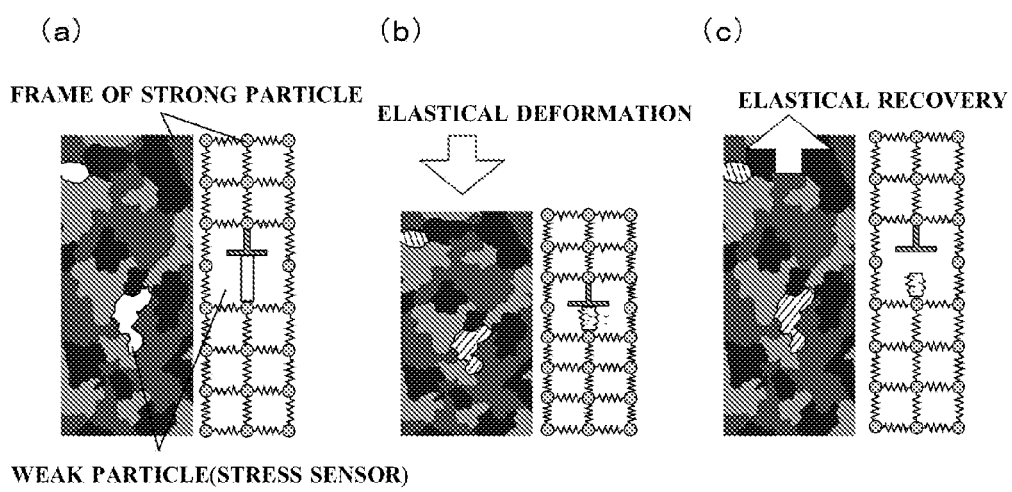

FIG. 3 is a diagram illustrating the concept of a method for measuring stress and strain history of a composite material containing calcite particles as a stress sensor. (a) of FIG. 3 shows a state of the composite material which receives no external forces and (b) of FIG. 3 shows a state of the composite material which receives a compression force to be compressed and deformed, and (c) of FIG. 3 shows a state of the composite material which is relieved from the external force to be elastically recovered.

Figure 4:
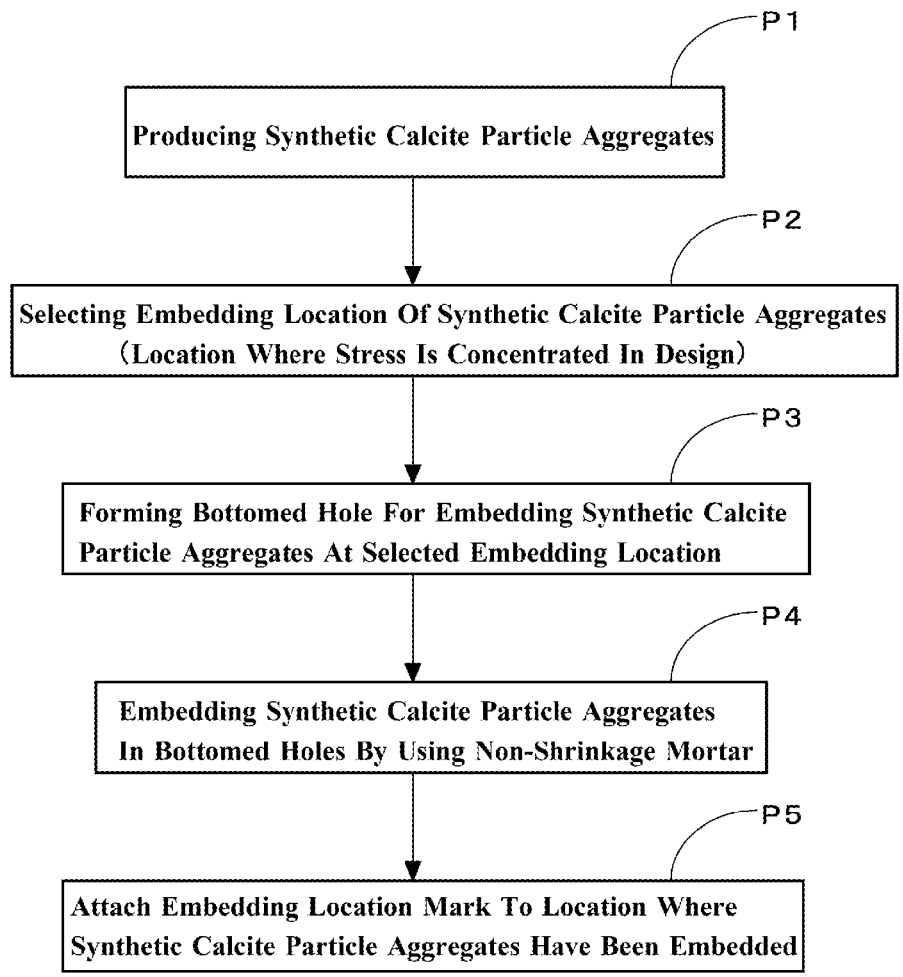

FIG. 4 is a flow diagram showing a procedure for embedding synthetic calcite particles into an existing building.

Figure 5:
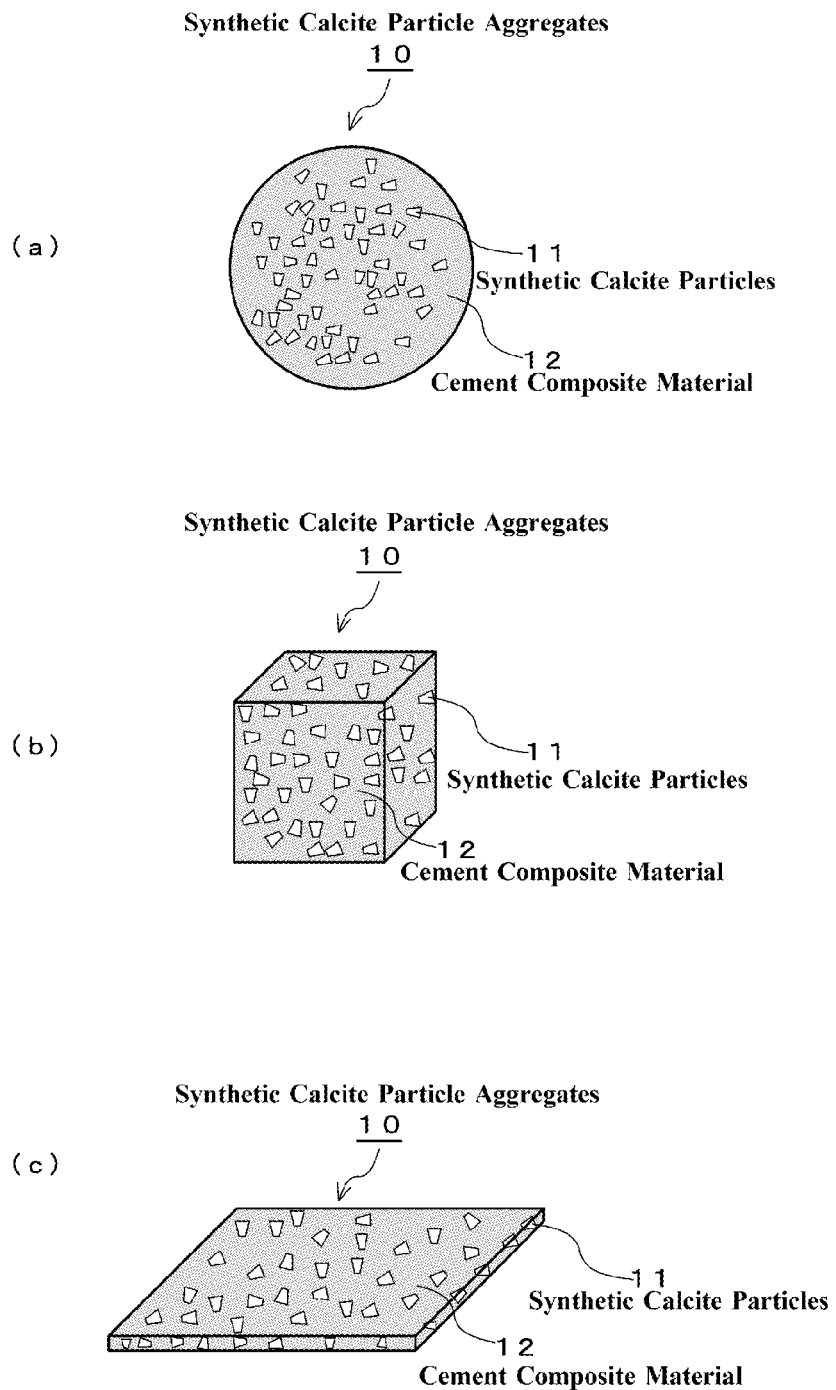

FIG. 5 is an explanatory diagram showing an example of shapes of synthetic calcite particles aggregates according to the present invention.

Figure 6:
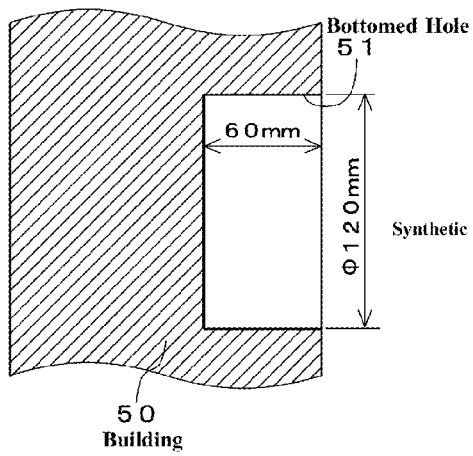
Figure 6:
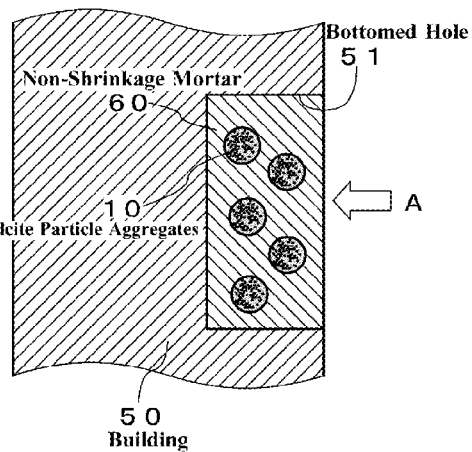
Figure 6:
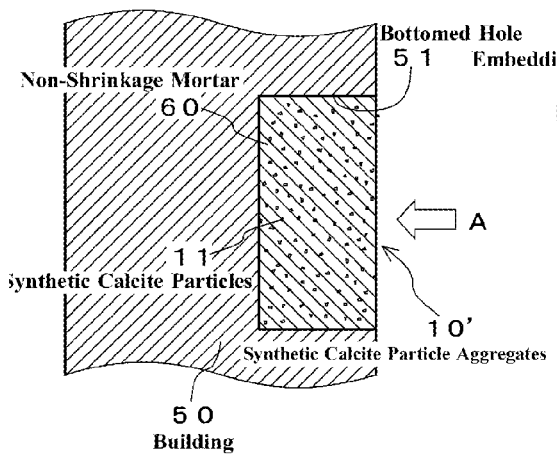
Figure 6:
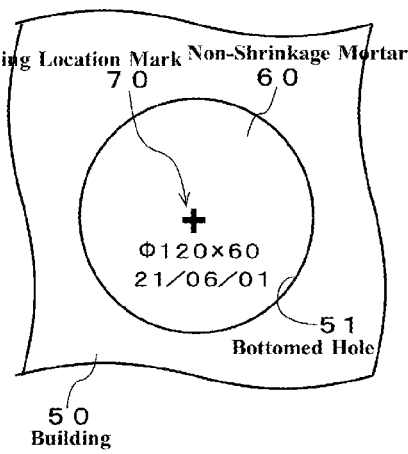

FIG. 6 is an explanatory cross-sectional view of a main part showing an example of embedding synthetic calcite particle aggregates in an existing building as an object to be measured.

Figure 7:
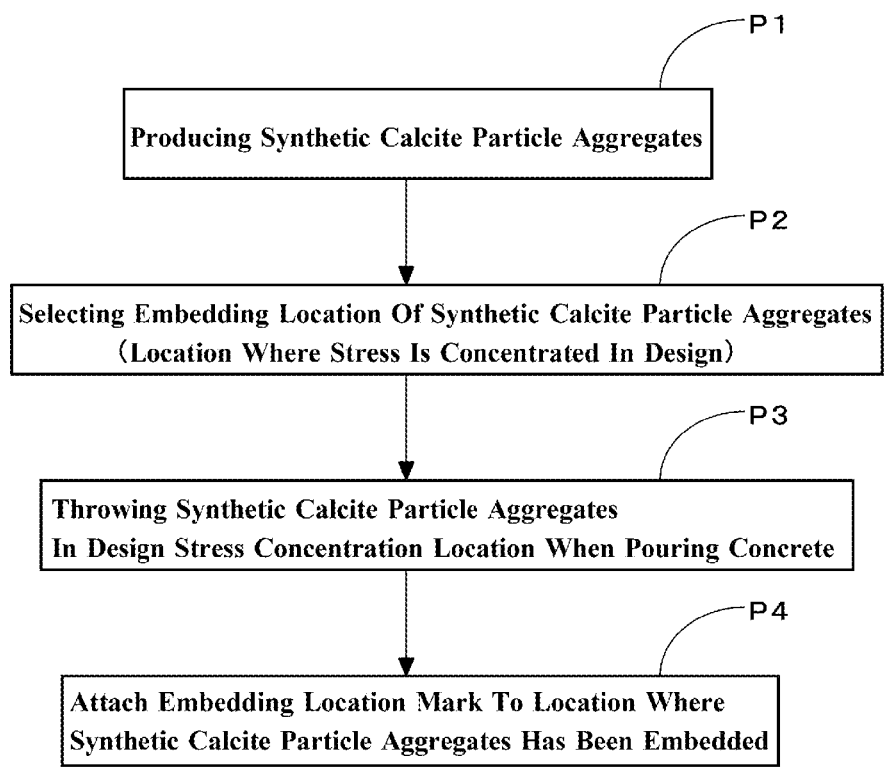

FIG. 7 is a flow diagram showing a procedure for embedding synthetic calcite particles into a new building.

Figure 8:
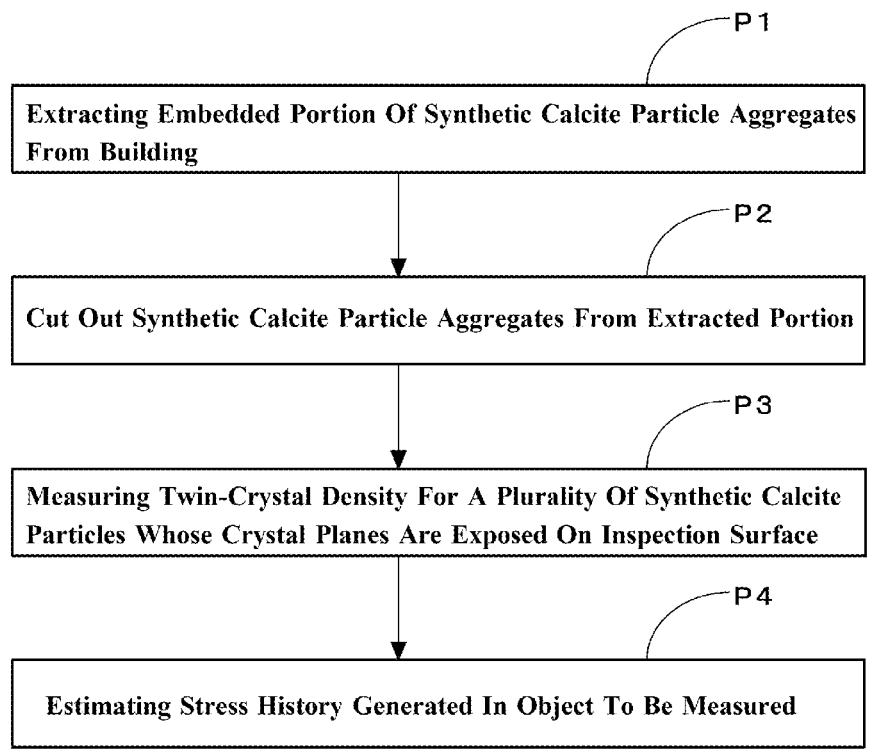

FIG. 8 is a flow diagram showing a procedure for collecting synthetic calcite particle aggregates according to the present invention from an existing building.

Figure 9:
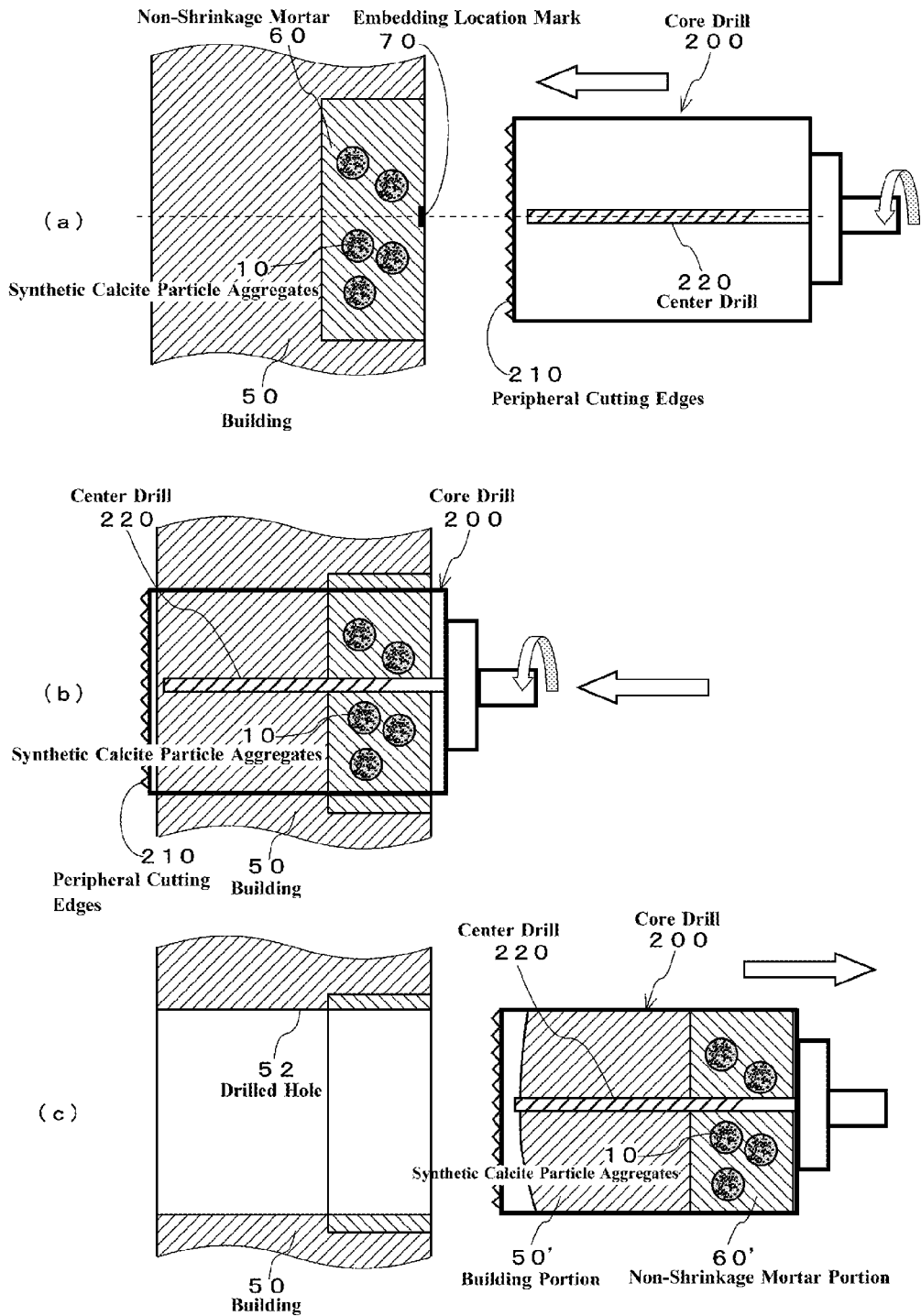

FIG. 9 is an explanatory cross-sectional view of a main part showing a configuration example of collecting a part of non-shrinkage mortar containing of synthetic calcite particles aggregates from an existing building.

Figure 10:
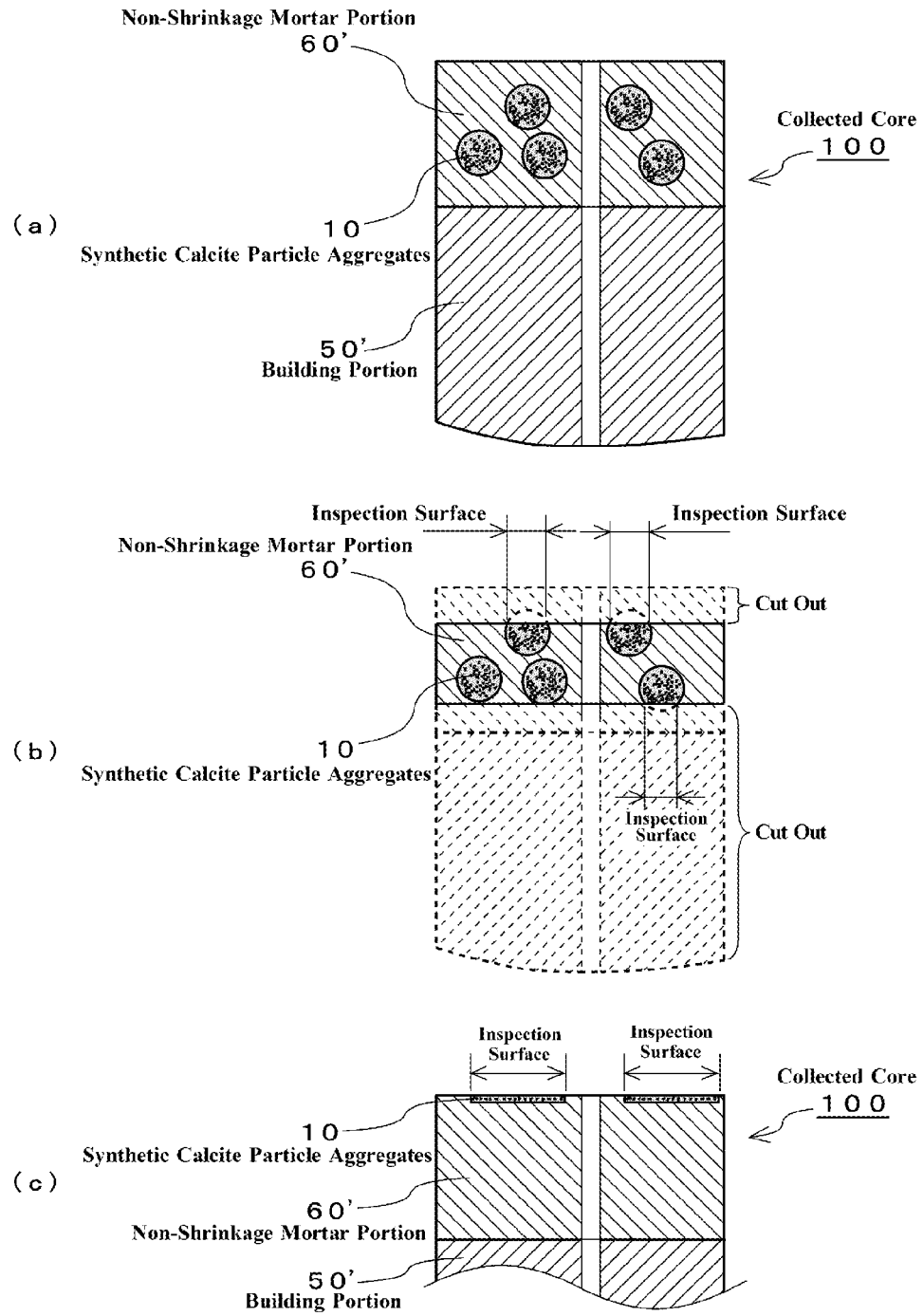

FIG. 10 shows a cross-sectional explanatory view of a main part of a collected core extracted from the building, a synthetic calcite particle aggregates cut out from the collected core, and a collected core in which the flat plate-shaped synthetic calcite particle aggregates are embedded flush with a surface of a building.

DETAILED DESCRIPTION

An estimation method of stress and strain history in a structural material such as concrete according to an embodiment of the present invention are hereinafter described in detail with reference to accompanying drawings. The estimation method of stress and strain history in a structural material such as concrete according to the present invention, as is common to the prior arts of the Patent Document 2 and Non-Patent Document 1 in terms of having calcite particles embedded as a stress sensor inside of the structural material as well as measuring a stress history by using a relation between the stress generated from external forces received by the structural material and the twin-crystal density in calcite particles (hereinafter referred to as "calcite twin-crystal density"), is configured to be improved so as to solve the problems of these prior arts.

For example, in Non-Patent Document 1, it was found by a compression test of sandstone that the calcite twin-crystal density is proportional to the differential stress. However, since the said proportional coefficient is related to an element with respect to strain and elastic modulus, it is thought, after further study, that there remain problems as a realistic evaluation method. Furthermore, when the structural material is a cement-based composite material, it is known that the elastic modulus changes depending on the mixing ratio of cement and water. Therefore, it is desirable that the method of measuring the stress history can be applied to structural materials with different elastic moduli.

The concept of a method for measuring the stress history of an object to be measured containing calcite particles as a stress sensor inside of a structural material will be explained with reference to FIG. 3. In each of (a) to (c) of FIG. 3, the illustration on the left side shows a partial cross-sectional view of the object to be measured in which strong particles and weak particles are mixed, in which the stronger the particle, the darker the color while the weaker the particle, the paler the color. The white particles are a stress sensor that can be elastically deformed by stress. The illustration on the right side shows schematically that the strong particles support the entire load elastically with connecting springs between the particles, and the stress sensor is interposed between them.

(a) of FIG. 3 shows a state of the object to be measured which receives no external forces and (b) of FIG. 3 shows a state of the object to be measured which receives a compression force to be wholly compressed and elastically deformed along a compression direction as well as the stress sensor deforms. (c) of FIG. 3 shows a state of the object to be measured which is relieved from the external force to be elastically recovered as a whole, and the stress and deformation due to external forces almost disappear while the shape of the stress sensor is not recovered as well as the stress history of the stress sensor still remain. The measurement of the stress history in the object to be measured is carried out based on this concept. In the calcite particles used as a stress sensor, deformed crystal planes appear as a deformation twin crystal between simple crystal structures due to deformation when subjected to an external force. It is noted that the term "calcite twin-crystal density" means the number of deformation twin crystals per 1 mm length in the axial direction orthogonal to the e-plane where twin crystals are generated.

The amount of deformation of the object to be measured when subjected to an external force in the direction of compression depends on the elastic modulus of the object to be measured as a whole, which is corresponds to the strength of the springs that connect the frames of strong particles shown in each right side of the (a) to (c) of FIG. 3. That is, the twin crystal deformation remaining in the calcite particles as a stress sensor differs depending on the strength of this spring. Therefore, if the elastic modulus of the object to be measured differs, it is thought that the relationship between stress and twin-crystal deformation will also differ when subjected to an external force. The Non-Patent Document 1 obtains a relational expression between the amount of change in calcite twin-crystal density and stress for sandstone. However, it is thought that this relationship cannot be said to hold for structural materials such as cement-based composite materials. Therefore, in the present invention, studies are being made from the viewpoint of obtain a proper relational expression when it is carried out to measure stress histories for a wider range of structural materials.

The composite material as an object to be measured contains a large number of calcite particles, and the calcite particles are synthetic calcite particles. Most of the natural calcite particles are too small in particle size compared to the synthetic calcite particles, making it impossible to determine the stress. In addition, since natural calcite particles are substantially free of non-twin crystals, they are not suitable for the method of estimating the stress and strain history in structural materials such as concrete according to the present invention. Therefore, it is necessary to use synthetic calcite particles in the estimation method of the stress and strain history in structural materials such as concrete according to the present invention. This synthetic calcite particles are synthesized by a method for producing a calcite single crystal as disclosed in the Patent Document 4.

In the present invention, the synthetic calcite particles contained in the composite material have the following conditions.

(a) Size of Synthetic Calcite Particles

The shape of the synthetic calcite crystal is a parallelepiped, and the particle size is represented by the short side of the parallelepiped. The particle size too small for easy detection, too large affects the strength of the composite material. Therefore, as the size of the particles, the particle diameter is preferably in the range of 5 μm (0.005 mm) to 1.50 mm, more preferably 0.01 to 1.20 mm, and still more preferably 0.1 to 1.0 mm.

(b) Mixing Ratio of Synthetic Calcite Particles

Further, the mixing ratio of the synthetic calcite particles in the composite material is preferably 0.3 to 10% by volume, more preferably 1 to 5% by volume, for easy detection of the particles without reducing the strength of the composite material.

[Verification of Relationship Between Stress and Twin-crystal density by Elastic Modulus]

The relationship between stress and twin-crystal density of calcite particles after receiving the compression load is respectively obtained for a plurality of the objects to be measured of the cement-based composite materials with different elastic modulus. These relationships have been investigated with comparison to each other. For each of the cement-based composite materials as an object to be measured for which the relationship between stress and twin-crystal density is to be determined, calcite particles are mixed in a specific proportion. The calcite particles were synthesized as follows.

[A] Synthesis of Calcite Particles

The synthesis of calcite particles was carried out in accordance with the method of the Patent Document 4 in the following steps.

(1) 5 M Ammonium Adjustment

Four of 1 L beakers are prepared, 400.2 g of ammonium nitrate is put into each of them, 1 L of water is added, and the contents are stirred with a magnetic stirrer as being heated until they become transparent.

(2) pH Adjustment

The solution obtained from the above-mentioned (1) is adjusted to pH 7.50 immediately before reacted. Ammonia is added when the pH is tried to be raised.

(3) Reaction Preparation

Add 4 L of the pH adjusted solution to the container. To this is added 36 g (9 g/L) of calcium carbonate. A handle is attached to Teflon (registered trademark) and placed in an autoclave.

(4) Autoclave Operation

The autoclave operation was carried out by a program in which the temperature was raised to 180° C. and held at 180° C. for 12 hours, and lowered to 30° C. in 60 hours.

(5) Post-Treatment and Filtration

After autoclave operation, suction filtration of the produced slurry is performed to obtain synthetic calcite particles.

[B] Forming and Testing Object to be Measured

A cement for high-strength concrete is used, and three types of objects to be measured are prepared in which the ratio of cement to water is a reference amount, 1.5 times of the reference amount, 2 times of the reference amount, respectively. Each of the objects to be measured has a different elastic modulus depending on the ratio of cement to water, and due to the difference in average elastic modulus E, there are three types of cements: hard cement (E: 10.1 GPa); medium cement (E: 8.6 GPa); and soft cement (E: 5.9 GPa).

The synthetic calcite particles with a particle diameter of 0.2 to 0.5 mm are mixed at a rate of 1 to 5% by volume with each cement, cured for 4 weeks before formed into a diameter of 20 mm and a length of about 40 mm and are served for a compression test. The compression test uses a UH-1000 kN type testing machine (manufactured by Shimadzu Corporation) under atmospheric pressure, applies stress from low stress to breaking stress, making the sample at that time a thin piece, and observing several tens of particles or more with a polarizing microscope, to measure the twin-crystal density of calcite particles. This measurement is to scan the entire surface to be inspected with a polarizing microscope, and calculate a representative value of twin-crystal density for a plurality of calcite particles in which the presence or absence of twin crystal can be confirmed. The twin-crystal densities of each of the samples containing a plurality of calcite particles are represented by the mode of the frequency distribution.

Figure 1:
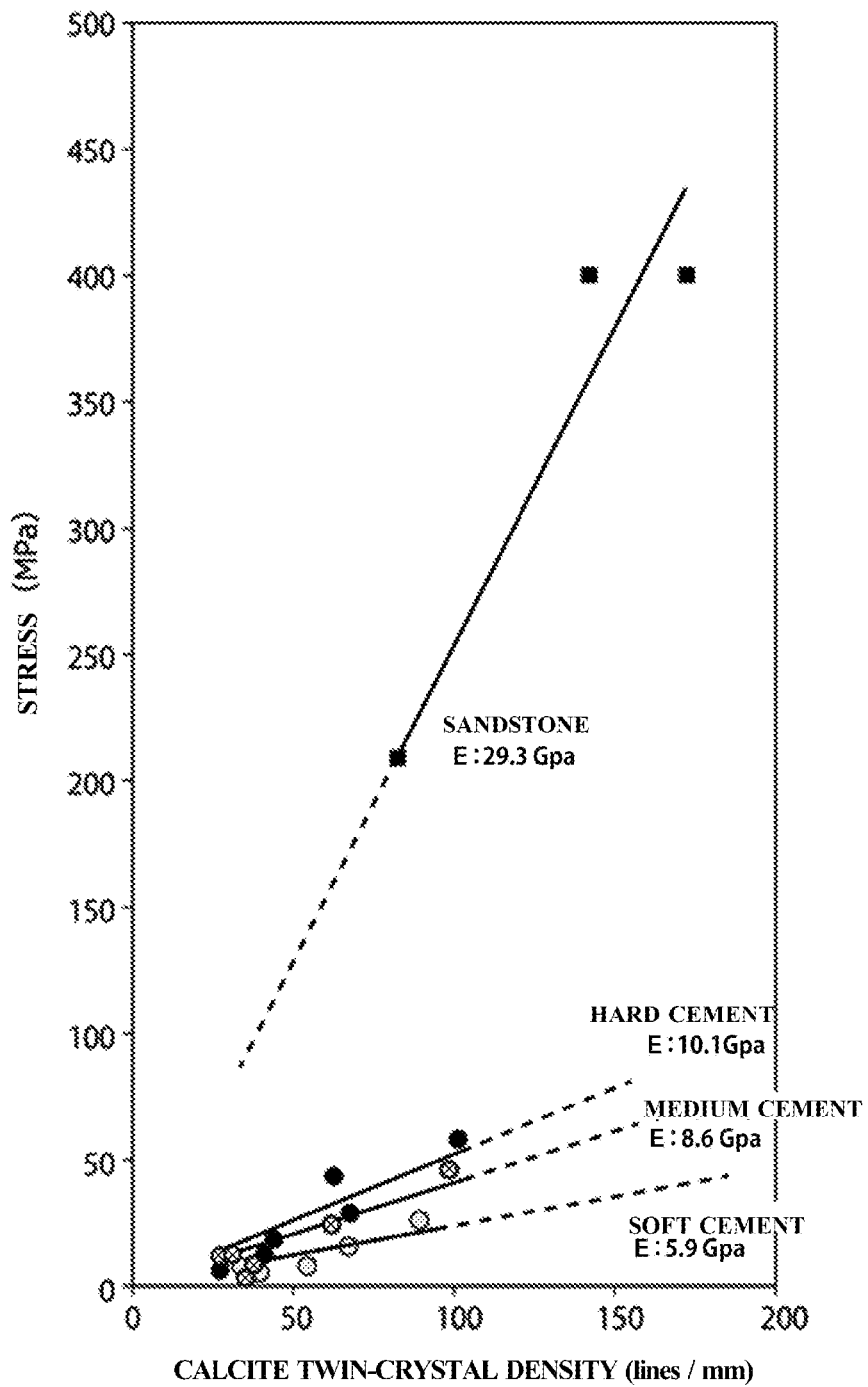
FIG. 1 is a diagram showing a relation between stress and twin-crystal density relationship for multiple types of composite materials containing calcite particles and having different elastic moduli, which is disclosed as prior art of the method according to the present invention.

FIG. 1 shows the relationship between the applied stress and the resulting twin-crystal density for each of the three types of objects to be measured of the cement-based material. In FIG. 1, the results of measurements on sandstone are also shown for reference. As can be found from the results shown in FIG. 1, the relationship between the stress and the twin-crystal density of the object to be measured is represented by a linear relational expression for each of three types of the cement-based material, which is different from each other depending on the elastic modulus of the cement-based material. That is, in order to convert the stress from the twin-crystal density, it is necessary to obtain the relational expression for each of the cement-based materials.

Figure 2:
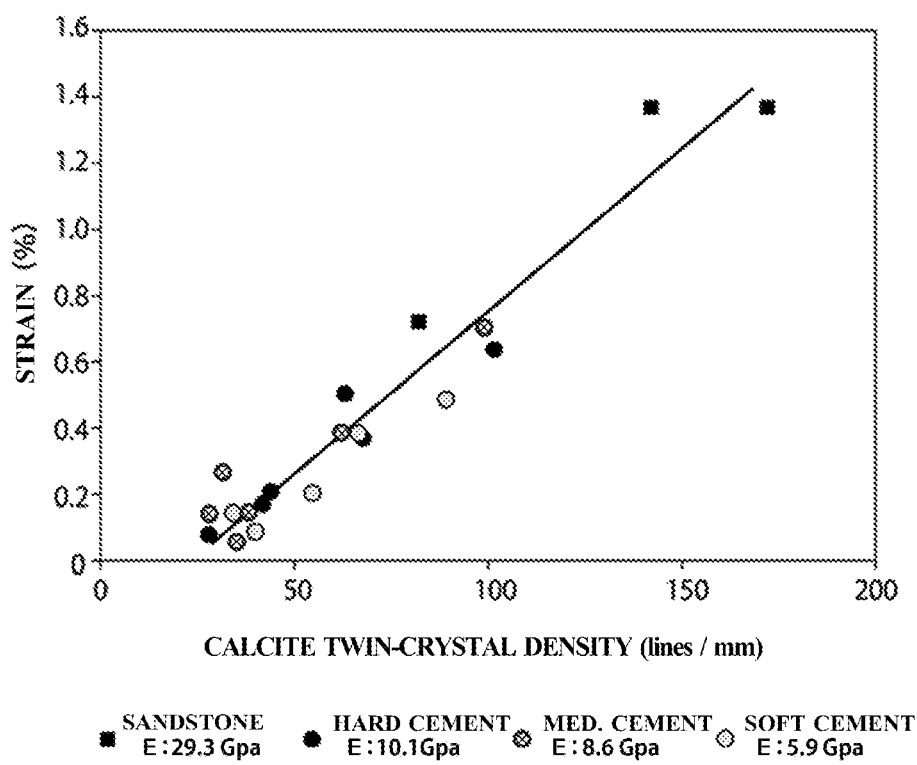
FIG. 2 is a diagram showing a relation between stress and twin-crystal density relationship for multiple types of composite materials containing calcite particles and having different elastic moduli, which is one of features of the method according to the present invention.

On the other hand, FIG. 2 shows the relationship between the strain and the twin-crystal density when a load is applied to each of objects to be measured. As can be seen from FIG. 2, the relation between strain ε (%) and twin-crystal density Dtw (lines/mm) for the objects to be measured of each of the cement-based materials, including sandstone, has a distribution represented by a single common straight line. This straight line is expressed by the relational expression (1):

$$\varepsilon = 0.0094 Dtw - 0.2 \tag{1}$$

The twin-crystal density Dtw represents the mode of the frequency distribution as a representative value of the twin-crystal density. In FIGS. 1 and 2, the Dtw on the horizontal axis indicates the representative value (lines/mm) of the twin-crystal density.

As described above, the relationship between stress and twin-crystal density varies depending on the material and elastic modulus of the object to be measured as shown in FIG. 1 while the relationship between strain and twin-crystal density is represented by one common approximate expression (1) independent of the material and elastic modulus of the object to be measured as shown in FIG. 2.

In the conventional method disclosed in the Non-Patent Document 1, the stress is estimated by converting the twin-crystal density of calcite particles into the stress. However, this conversion formula differs depending on the material of the object to be measured, and then, the estimation of stress history could not be performed in a common manner. By converting the twin-crystal density into the strain using the approximate expression (1) representing the relationship between strain and twin-crystal density relationship, the estimation of stress history can be performed in a common manner regardless of the material of the object to be measured. Therefore, by using the relationship (2) between stress (σ), strain (ε), and elastic modulus (E):

$$\sigma = \varepsilon E \tag{2}$$

it is possible to convert the strain into the stress to estimate the stress history of the object to be measured.

In the estimation method of stress and strain according to the present invention described above, it becomes possible to estimate the stress generated in a cement-based composite material, by simply adding synthetic calcite particles to the cement-based composite material and measuring the twin-crystal density of the calcite particles. In the conventional method of attaching an electrical sensor to a composite material, the electrical sensor becomes a foreign object in the composite material, which inevitably affects the mechanical properties of the composite material. According to the present invention, since the calcite particles to be mixed originally exist inside of the cement-based material, and do not become any foreign objects as long as added in small amounts.

[Industrial Applicability]

An estimation method of stress and strain history according to the present invention, can be applied to inspecting, for facilities and structures that are constantly subjected to stress, whether the specified strength is maintained or whether the structure itself has deteriorated, after having been affected by earthquakes etc. to extent that they are not destroyed, as well as can be applied to monitoring local stress concentration due to deterioration of facilities and structures.

As above-mentioned, an estimation method of stress and strain history of cement-based composite materials according to the present invention, has showed that by measuring the twin-crystal density (Dtw) of calcite particles contained in the object to be measured after having received an external force, it becomes possible to quantitively estimate the stress and strain history generated in the object to be measured. Hereinafter, there will be respectively described synthetic calcite particles as a stress sensor regarding; embedding the synthetic calcite particles in buildings (concrete structural materials) mainly made of cement as an object to be measured; collecting (extracting) the embedded synthetic calcite particles from the buildings in order to measure the twin-crystal density (Dtw); and measuring the twin-crystal density of the collected synthetic calcite particle.

[Embedding Synthetic Calcite Particles into Buildings]

FIG. 4 is a flow diagram showing a procedure for embedding synthetic calcite particles into an existing building.

First, a procedure P1 is to produce a synthetic calcite particle aggregates 10. It should be noted that the said synthetic calcite particle aggregates 10 means, as shown in FIG. 5, a solidified product in where a large number (plurality) of synthetic calcite particles 11 as a stress sensor are mixed in a cement composite material 12 serving as a base material, having a predetermined shape as a whole. The cement composite material 12 serving as a base material is a cement-based composite material that can be elastically deformed after receiving an external force and specifically corresponds to the cement-based composite material of which average elastic modulus E is known, for example, the three types of cements etc.: hard cement (E: 10.1 GPa); medium cement (E: 8.6 GPa); and soft cement (E: 5.9 GPa); as prepared by changing the ratio of cement to water in the aforementioned "[B] Forming and Testing Object To Be Measured".

It is also possible to use mortar as the cement composite material 12 other than the mixture of cement and water. In this case, the ratio of cement to sand in the mortar is, for example, 1:2 by weight, and the modulus of elasticity is adjusted according to the water content. Synthetic calcite particles 11 having a particle diameter of, for example, 0.2 to 0.5 mm are mixed with this mortar prepared to have a predetermined elastic modulus so that the content ratio is, for example, 1 to 5% by volume.

It should be noted that the synthetic calcite particles 11 are non-twin-crystal synthetic calcite particles. Non-twin-crystal synthetic calcite particles 11 can be synthesized by the aforementioned "[A] Synthesis of Calcite Particles". By using the non-twin-crystal synthetic calcite particles 11, the initial value of the twin-crystal density Dtw of the synthetic calcite particles becomes zero and consequently, the aftermentioned estimation of stress history (procedure P4 in FIG. 8) becomes easier.

When the cement composite material 12 is mortar, the particle size (particle diameter) of the synthetic calcite particles 11 is preferably the same size as the particle size of sand, as aggregates constituting the mortar, specifically e.g., 63 µm (0.063 mm) to 2000 µm (=2 mm). Further, the "particle diameter of synthetic calcite particles", as said in this specification, means to the minor diameter of a rectangle circumscribing the maximum projection plane. On the other hand, when the particle size of the synthetic calcite particles 11 is excessively large, the obtained synthetic calcite particle aggregates 10 tends to not have the necessary and sufficient strength. If the diameter is too small, it becomes difficult to measure the twin-crystal density Dtw of the synthetic calcite particles on the crystal plane.

Further, the content ratio of the synthetic calcite particles 11 in the synthetic calcite particle aggregates 10 is, for example, preferably 0.3 to 10% by volume, more preferably 1 to 5% by volume. As a result, desired measurement (inspection) of stress can be reliably performed while reliably preventing a reduction in the strength of the obtained synthetic calcite particle aggregates 10.

(a) of FIG. 5 shows synthetic calcite particle aggregates 10 formed into a spherical shape. (b) of FIG. 5 shows synthetic calcite particle aggregates 10 shaped into a cube. (c) of FIG. 5 shows synthetic calcite particle aggregates 10 formed into a flat plate. By using the synthetic calcite particle aggregates 10, the number of synthetic calcite particles necessary for measuring the twin-crystal density Dtw of the synthetic calcite particles can be secured on the inspection surface. An example of a forming method for the synthetic calcite particle aggregates 10 will be described below.

[Forming Method of Synthetic Calcite Particle Aggregates 10]

For example, when the finished shape is spherical, synthetic calcite particles 11 having a particle diameter of 0.2 to 0.5 mm are mixed with the cement composite material 12 so that the content ratio is 1 to 5% by volume, and this mixture is filled in a mold having a recess (cavity) of a spherical surface. The spherical synthetic calcite particle aggregates 10 can be formed by curing the mixture in the mold for a predetermined period of time (for example, 4 weeks). Therefore, by changing the mold, the synthetic calcite particle aggregates 10 having another shape other than a sphere can also be favorably formed. It should be noted that synthetic calcite particles 11 may be colored with a reagent such as alizarin red or the like before being mixed with the cement composite material 12 so that the occurrence of twin-crystal deformation can be easily detected in the measurement of the twin-crystal density Dtw at the time of stress estimation.

The size of the finished synthetic calcite particle aggregates 10 is, for example, about 10 to 50 mm in maximum outer diameter. It should be noted that the finished size varies depending on the size of the after-mentioned bottomed hole 51.

Returning to FIG. 4, a procedure P2 is to select the embedding location of the synthetic calcite particle aggregates 10. As for the location where the synthetic calcite particle aggregates 10 is to be embedded in the existing building 50, it is preferable to select a location where stress is concentrated in design.

A procedure P3 is to form a bottomed hole 51 for embedding the synthetic calcite particle aggregates 10 at the selected embedding location ((a) of FIG. 6). The shape and size of the bottomed hole 51 is such that the strength of the building 50 is not affected. For example, for synthetic calcite particle aggregates 10 having a maximum outer diameter of about 10 to 50 mm, it is possible to form cylindrical bottomed holes with a diameter of 120 mm and a depth of 60 mm.

A procedure P4 is to embed the synthetic calcite particle aggregates 10 in the bottomed holes 51 by using a non-shrinking mortar 60 ((b) of FIG. 6). Specifically, the synthetic calcite particle aggregates 10 are mixed while the bottomed holes 51 are backfilled with the non-shrinkage mortar 60.

A procedure P5 is to attach an embedding location mark (marking) 70 to the location where the synthetic calcite particle aggregates 10 has been embedded ((d) of FIG. 6). The embedding location mark 70 can be attached, for example, to the center of the bottomed hole 51. In addition, the size of the bottomed hole 51 (Φ120×60), the date when the synthetic calcite particle aggregates 10 has been embedded in the building 50, etc. can be added.

The above is the procedures for embedding the synthetic calcite particles 11 into the existing building 50 using the synthetic calcite particle aggregates 10. By the way, it is also possible to embed the synthetic calcite particles 11 in the existing building 50 without using the synthetic calcite particle aggregates 10.

As shown in (c) of FIG. 6, when the synthetic calcite particle aggregates 10 is not used, the synthetic calcite particles 11 can be embedded in an existing building 50 by backfilling the bottomed holes 51 with a mixture of synthetic calcite particles and mortar (hereinafter as referred to as a synthetic calcite particle aggregates 10'), as prepared in advance so as to have a predetermined elastic modulus by adding water, in which the synthetic calcite particles 11 are mixed with the non-shrinking mortar 60 so that the content ratio is, for example, 1% by volume.

In addition, as shown in FIG. 7, as for the procedure for embedding synthetic calcite particles in a new building, instead of the aforementioned procedures P3 and P4 in FIG. 4, a procedure of "throwing the synthetic calcite particle aggregates 10 in the design stress concentration location when pouring concrete" is carried out. Next, a procedure for collecting the synthetic calcite particle aggregates 10 embedded in the building 50 will be described below.

FIG. 8 is a flow diagram showing a procedure for collecting the synthetic calcite particle aggregates 10 from the building 50 and an estimation of stress history. For convenience of explanation, it is assumed that the synthetic calcite particles 11 are embedded in the building 50 in the form of aggregates 10 of synthetic calcite particles.

First, a procedure P1 is to extract a portion of non-shrink mortar 60 containing a plurality of synthetic calcite particle aggregates 10 from existing building 50. For extraction, for example, a commercially available core drill 200 for concrete structural materials (FIG. 9) can be used to extract a portion of the non-shrinkage mortar 60 in a core-cylinder shaped form. The extraction of the embedded portion of synthetic calcite particle aggregates 10 by the core drill 200 will be briefly described below.

As shown in (a) of FIG. 9, the core drill 200 (illustration of the electric motor for rotating the core drill 200 is omitted) has peripheral cutting edges 210 disposed at the distal end of hollow cylindrical main body and a center drill 220 disposed on the central axis inside of the main body. The peripheral cutting edges 210 and the center drill 220 rotate together. The peripheral cutting edges 210 is for cutting the building 50 into a core-cylinder shaped form, and the center drill 220 is for screwing into the cut core-cylinder for the core drill 200 to capture.

First, the core drill 200 is positioned so that the embedding location mark 70 of the synthetic calcite particles is located on the central axis of the center drill 220, for example. While maintaining the relative positional relationship between the embedding location mark 70 and the center drill 220, the core drill 200 is rotated and moved forward toward the side of the building 50 side.

As shown in (b) of FIG. 9, the core drill 200 is rotated and penetrated into the building 50 to a predetermined depth until the plurality of synthetic calcite particle aggregates 10 are taken into the core drill 200.

As shown in (c) of FIG. 9, the rotation of the core drill 200 is stopped and moved in the opposite direction after the core drill 200 has penetrated into the building 50 to a predetermined depth. In this case, since the center drill 220 is screwed into both of the extracted the building portion 50' and the non-shrinking mortar portion 60', by moving the core drill 200 in the opposite direction without rotation, the embedded portion of the synthetic calcite particle aggregates 10 can be extracted from the building 50.

Returning to FIG. 8, as a procedure P2, the synthetic calcite particle aggregates 10 is cut out from the collected core 100 extracted from the building 50. As shown in (a) of FIG. 10, the collected core 100 extracted from the building 50 is composed of the non-shrinking mortar portion 60' containing the synthetic calcite particle aggregates 10 and the building portion 50'.

As shown in (b) of FIG. 10, the non-shrinking mortar portion 60' and the synthetic calcite particle aggregates 10 are cut out to expose the crystal planes of the plurality of synthetic calcite particles 11. The crystal planes of the synthetic calcite particles 11, that is, cut surfaces of the exposed the synthetic calcite particle aggregates 10 become inspection surfaces. The size of the inspection surface can be appropriately set according to the purpose.

As shown in (c) of FIG. 10, when the flat synthetic calcite particle aggregates 10 is embedded flush with the surface (wall surface) of the building 50 or slightly shallower than the surface, it is not necessary to cut out the synthetic calcite particle aggregates 10 from the collected core 100. In this case, the crystal planes of the plurality of synthetic calcite particles 11 can be preferably exposed by polishing the surface of the object to be measured to such an extent that the strength of the object itself is not affected. In addition, since the measurement can be performed non-destructively, it is possible to perform continuous observation such as aging or comparison before and after an accident, for example.

Returning to FIG. 8, a procedure P3 is to measure the twin-crystal density for a plurality of synthetic calcite particles 11 whose crystal planes are exposed on the inspection surface. As aforementioned, the twin-crystal density of the synthetic calcite particles can be defined as the number of twin crystals per a predetermined length (1 mm, for example) in the axial direction orthogonal to the e-plane where twin crystals are generated and therefore, it is necessary to measure the number of twin crystals for each of the plurality of synthetic calcite particles 11 whose crystals are exposed on the inspection surface. The number of twin crystals is measured, for example, by scanning the entire inspection surface with an optical microscope and performing image analysis on the synthetic calcite particles 11 where crystal surfaces are exposed. That is, since the refractive index or reflectance changes with the deformation of the crystal lattice of the synthetic calcite particles 11, the presence or absence of twin crystals in the synthetic calcite particles 11 can be easily determined by analyzing the change in the refractive index or reflectance. As a result, it is possible, for each of the plurality of synthetic calcite grains 11 with exposed crystal planes, to measure the number of twin crystals contained per a predetermined length (1 mm, for example) in the axial direction perpendicular to the e-plane where twin crystals are generated. The average value of the measured number of twin crystals included per the predetermined length is to become the twin-crystal density Dtw of the synthetic calcite.

Next, a procedure P4 is to estimate the stress history generated in the object to be measured. As aforementioned, the average of the twin-crystal density Dtw of a plurality of synthetic calcite particles existing in the object to be measured having a predetermined size, depends on a magnitude of external force and tends to increase as the external force becomes greater and specifically, is proportional with the magnitude of external force. Therefore, it is possible to estimate the stress history generated in the object to be measured (building 50) based on the degree of change of the obtained average of the twin-crystal density Dtw from the initial value (0, for example).

Therefore, in the case that the elastic modulus E of the cement composite material 12 of the synthetic calcite particle aggregates 10 is adjusted to, e.g., 10.1 GPa, the twin-crystal density Dtw measured in the aforementioned procedure P3 is plugged into the relational expression between stress and calcite twin-crystal density for the hard cement (E: 10.1 GPa) in FIG. 1, so that it is possible to estimate the history of stress σ that has generated in the object to be measured (building 50).

Now, when the elastic modulus E of the cement composite material 12 is known but there is no relational expression (linear approximation formula) between stress and calcite twin-crystal density in FIG. 1 (for example, when 10.1 GPa<E<29.3 GPa), the twin-crystal density Dtw measured in the aforementioned procedure P3 is plugged into the aforementioned relational expression (1) between stress and calcite twin-crystal density shown in FIG. 2 to estimate the history of strain ε that has generated in the object to be measured (building 50), and subsequently the estimated the history of strain ε is multiplied by the elastic modulus E of the cement composite 12, consequently to estimate the history of stress σ that has generated in the object to be measured (building 50).

It should be noted that the embedded synthetic calcite particle aggregates 10' ((c) of FIG. 6), can be preferably collected from the building 50 by the collecting procedure of the synthetic calcite particles and the measuring procedure of the twin-crystal density Dtw of the synthetic calcite particles for the collected core, shown in FIG. 8, consequently to estimate the history of stress σ that has generated in the building 50.

In the estimation method of stress and strain according to the present invention described above, a plurality of the synthetic calcite particles 11 are calcite particles with no twin crystals that are mixed in a predetermined mixing ratio in a cement composite material 12 prepared in advance so that an elastic modulus becomes a predetermined value in a solidified state to be formed into a predetermined shape (e.g. sphere, polyhedron or plate) of a calcite particle aggregates 10 as a whole, and one or more of the calcite particle aggregates 10 are removably embedded in the building 50 with non-shrinkage mortar 60 or concrete structural material. Therefore, it becomes easy to embed the synthetic calcite particles 11 as a stress sensor into the building 50 and collect (extract) them from the building 50, as well as to measure the twin-crystal density Dtw of the synthetic calcite particles.

Similarly, when a plurality of the synthetic calcite particles 11 with no twin crystals are mixed in a predetermined mixing ratio in a cement composite material 12 prepared in advance so that an elastic modulus becomes a predetermined value in a solidified state to be formed into a calcite particle aggregates 10' having a fluidity and filled in the bottomed hole 51 of the building 50 to be embedded removably into the building 50, it also becomes easy to embed the synthetic calcite particles 11 as a stress sensor into the building 50 and collect (extract) them from the building 50, as well as to measure the twin-crystal density Dtw of the synthetic calcite particles.

When the synthetic calcite particles 11 is colored with reagents such as alizarin red, it become easy to confirm whether or not twin crystals exist in the synthetic calcite particles 11 where the crystal plane is exposed in the inspection surface.

Also, in the estimation method of stress and strain according to the present invention, the relation between the twin-crystal density Dtw of the synthetic calcite particles and the history of stress σ that has generated in the building 50 is configured to linearly approximate with each other for each elastic modulus of the cement composite material 12 or the non-shrinkage mortar 60. At the result, it becomes possible to uniquely estimate the history of stress σ that has generated in the building 50 from the measured twin-crystal density Dtw of the synthetic calcite particles.

Also, the relation between the twin-crystal density Dtw of the synthetic calcite particles and the history of strain ε that has generated in the building 50 is configured to linearly approximate with each other for each of the cement composite material 12 or the non-shrinkage mortar 60.

Therefore, even when the elastic modulus E of the cement composite material 12 or the non-shrinkage mortar 60 is known but the relation between the twin-crystal density Dtw and the history of stress σ that has generated in the building 50 is not configured to linearly approximate with each other, it becomes possibly to uniquely estimate the history of strain ε that has generated in the building 50 from the measured twin-crystal density Dtw of the synthetic calcite particles. By multiplying the estimated history of strain ε by the known elastic modulus E, it becomes possibly to estimate the history of stress σ that has generated in the building 50.

REFERENCE SIGNS LIST

10 synthetic calcite particle aggregates
10' synthetic calcite particle aggregates
11 synthetic calcite particles
12 cement composite material
50 building (object to be measured)
50' building portion
51 bottomed hole (recess)
52 drilled hole
60 non-shrinkage mortar
60' non-shrinkage mortar portion
70 embedding location mark
100 collected core
200 core drill
210 peripheral cutting edges
220 center drill

What is claimed:

1. An estimation method of stress and strain history regarding to an object to be measured (50) in which a plurality of calcite particles (11) having a particle diameter of a predetermined size are embedded as a stress sensor,
   wherein a plurality of the calcite particles (11) are calcite particles with no twin crystals that are mixed in a predetermined mixing ratio in a cement composite material (12) prepared in advance so that an elastic modulus becomes a predetermined value in a solidified state to be formed into a predetermined shape of a calcite particle aggregates (10) as a whole, and one or more of the calcite particle aggregates (10) are removably embedded in the object to be measured (50) with non-shrinkage mortar (60), and
   the calcite particle aggregates (10) after receiving an external force are processed to be extracted as a portion of the non-shrinkage mortar (60) from the object to be measured (50), and to be cut out to expose crystal planes of the calcite particles (11) so that a twin-crystal density (Dtw) thereof is measured, wherein the twin-crystal density (Dtw) is to be converted into strain (ε) based on an approximate formula showing a relationship between strain (ε) and twin-crystal density (Dtw), and the strain (ε) is to be converted into stress (σ) based on the elastic modulus.

2. An estimation method of stress and strain history in cement-based composite materials as set forth in claim 1 wherein the said shape is polyhedron.

3. An estimation method of stress and strain history in cement-based composite materials as set forth in claim 1, wherein the calcite particles (11) contained in the calcite particle aggregates (10) are colored.

4. An estimation method of stress and strain history in cement-based composite material as set forth in claim 1, wherein the calcite particle aggregates (10) contain non-twin-crystal synthetic calcite particles (11) having a particle size of 5 μm to 1.50 mm.

5. An estimation method of stress and strain history in cement-based composite material as set forth in claim 1, wherein the mixing ratio of the non-twin-crystal synthetic calcite particles (11) in the calcite particle aggregates (10) is 0.3 to 10% by volume.

6. An estimation method of stress and strain history in cement-based composite material as set forth in claim 1, wherein the calcite particle aggregates (10) collected from the object to be measured (50) are to have surfaces polished to such an extent that the twin crystals of the calcite particles (11) can be observed.

7. An estimation method of stress and strain history in cement-based composite material as set forth in claim 6 wherein the twin-crystal density (Dtw) of the calcite particles are measured on one or more surfaces of the polished calcite particle aggregates (10).

8. An estimation method of stress and strain history in cement-based composite material as set forth in claim 7 wherein a relationship between the twin-crystal density (Dtw) of the calcite particles and the stress history (σ) generated in the object to be measured (50) is configured to correspond to each other on one to one for each elastic modulus of the cement composite material (12) or the non-shrinkage mortar (60).

9. An estimation method of stress and strain history in cement-based composite material as set forth in claim 8, wherein when the elastic modulus of the cement composite (12) or the non-shrinkage mortar (60) is uniquely fixed, the relationship between the twin-crystal density (Dtw) of the calcite particles and the stress history ($\sigma$) is configured to be linearly approximated.

10. An estimation method of stress and strain history in cement-based composite material as set forth in claim 8, wherein the stress history ($\sigma$) generated in the object to be measured (50) is estimated, in a conversion from the twin-crystal density (Dtw) of the calcite particles to the stress history ($\sigma$), by using a following approximate formula (1) set in terms of the strain ($\varepsilon$) generated in the object to be measured (50) and typical values of the twin-crystal density (Dtw) of the calcite particles $$\varepsilon = 0.0094 Dtw - 0.2 \qquad (1)$$

to convert the measured twin-crystal density (Dtw) of calcite particles to strain ($\varepsilon$), and further to convert the strain ($\varepsilon$) to stress by the elastic modulus of the cement composite (12) or the non-shrinkage mortar (60).

* * * * *